Figure 1:
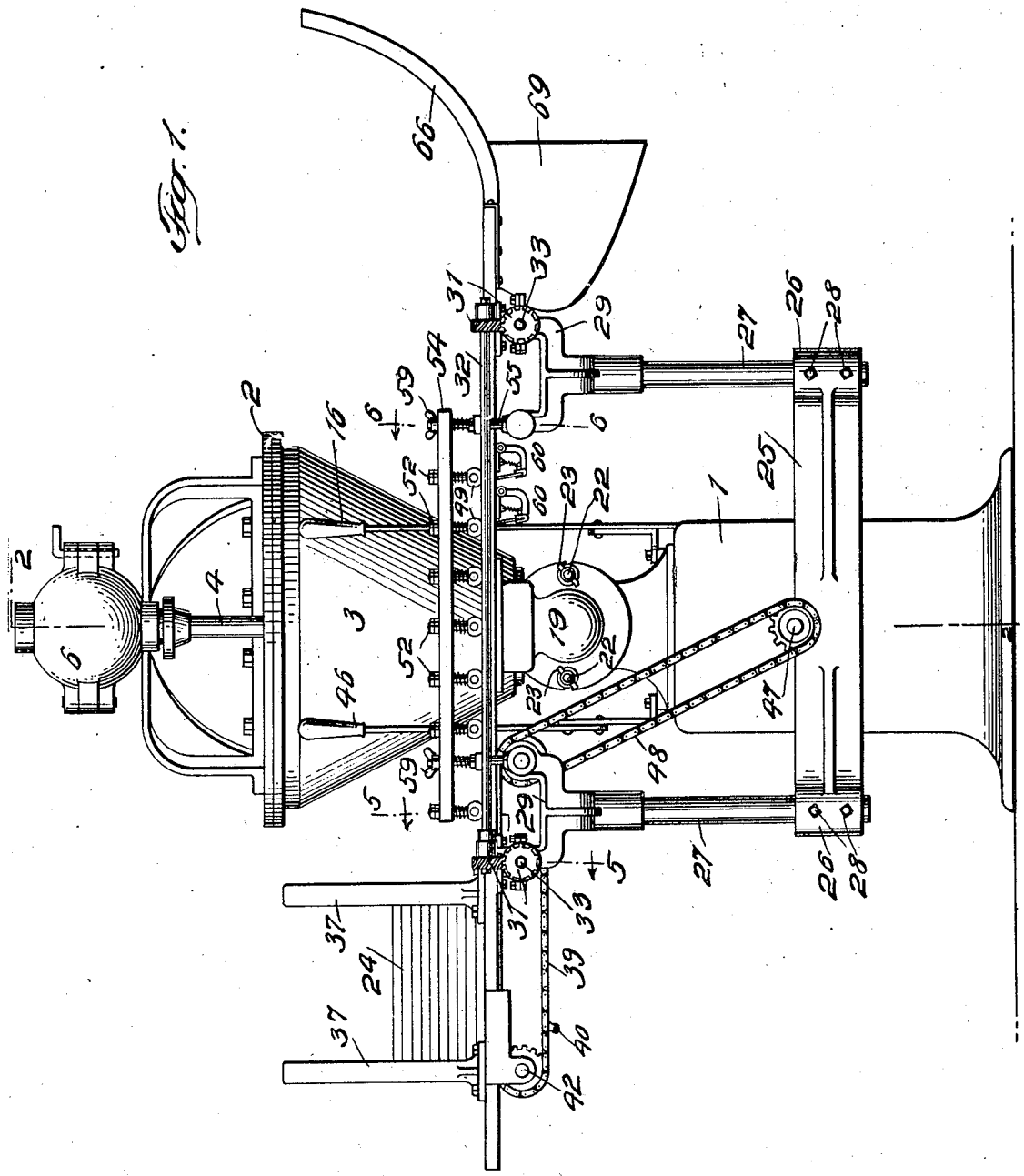

P. G. HOLLSTEIN.
MACHINE FOR MOLDING CHOCOLATE PASTE.
APPLICATION FILED FEB. 1, 1916.

1,196,865.

Patented Sept. 5, 1916.
5 SHEETS—SHEET 1.

WITNESS

INVENTOR
Paul G. Hollstein
BY
ATTORNEY

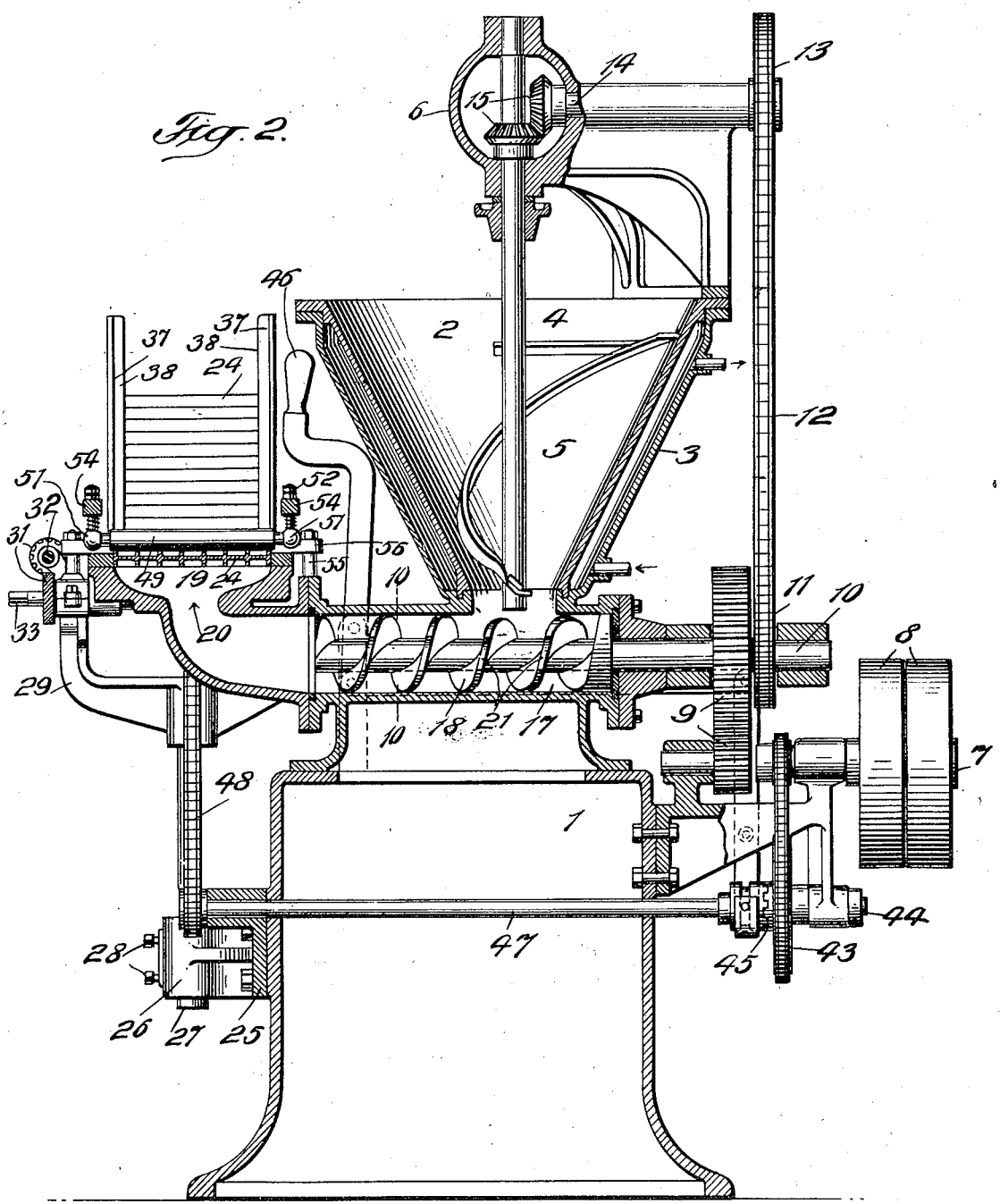

P. G. HOLLSTEIN.
MACHINE FOR MOLDING CHOCOLATE PASTE.
APPLICATION FILED FEB. 1, 1916.

1,196,865.

Patented Sept. 5, 1916.
5 SHEETS—SHEET 3.

P. G. HOLLSTEIN.
MACHINE FOR MOLDING CHOCOLATE PASTE.
APPLICATION FILED FEB. 1, 1916.
1,196,865.
Patented Sept. 5, 1916.
5 SHEETS—SHEET 4.
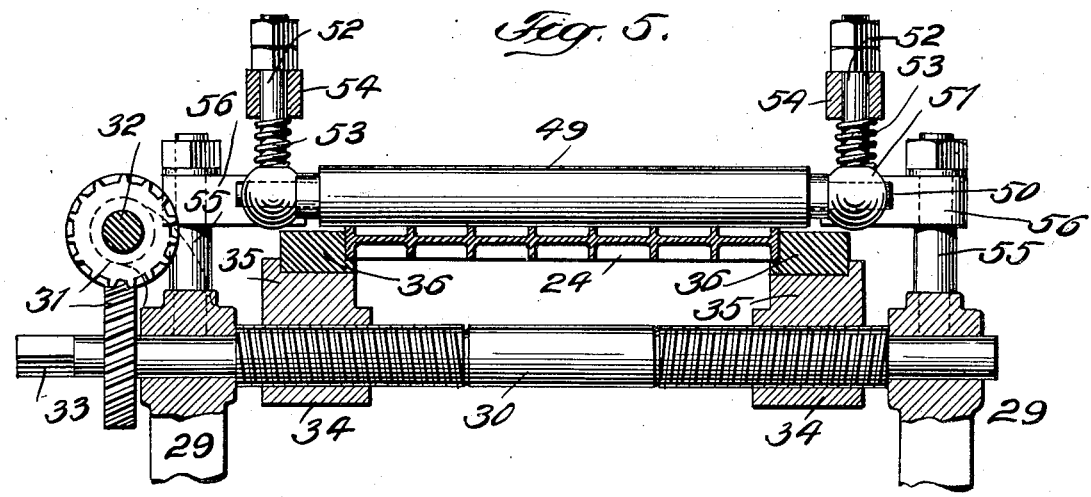
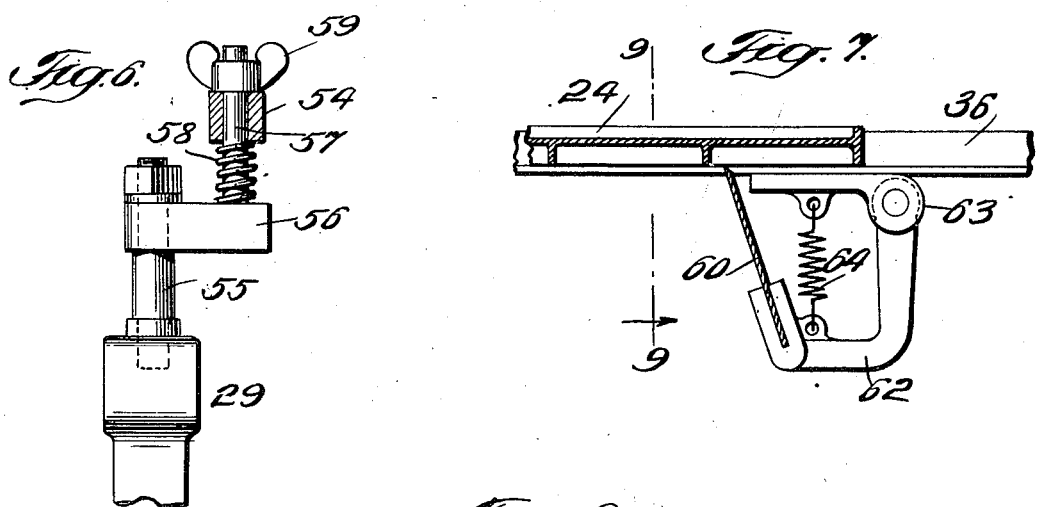
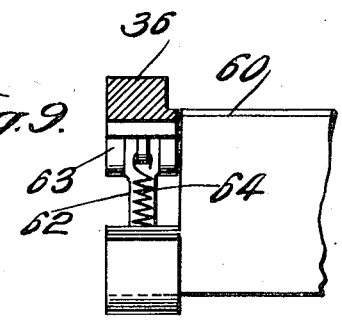
WITNESS
INVENTOR
Paul G. Hollstein
BY
ATTORNEY

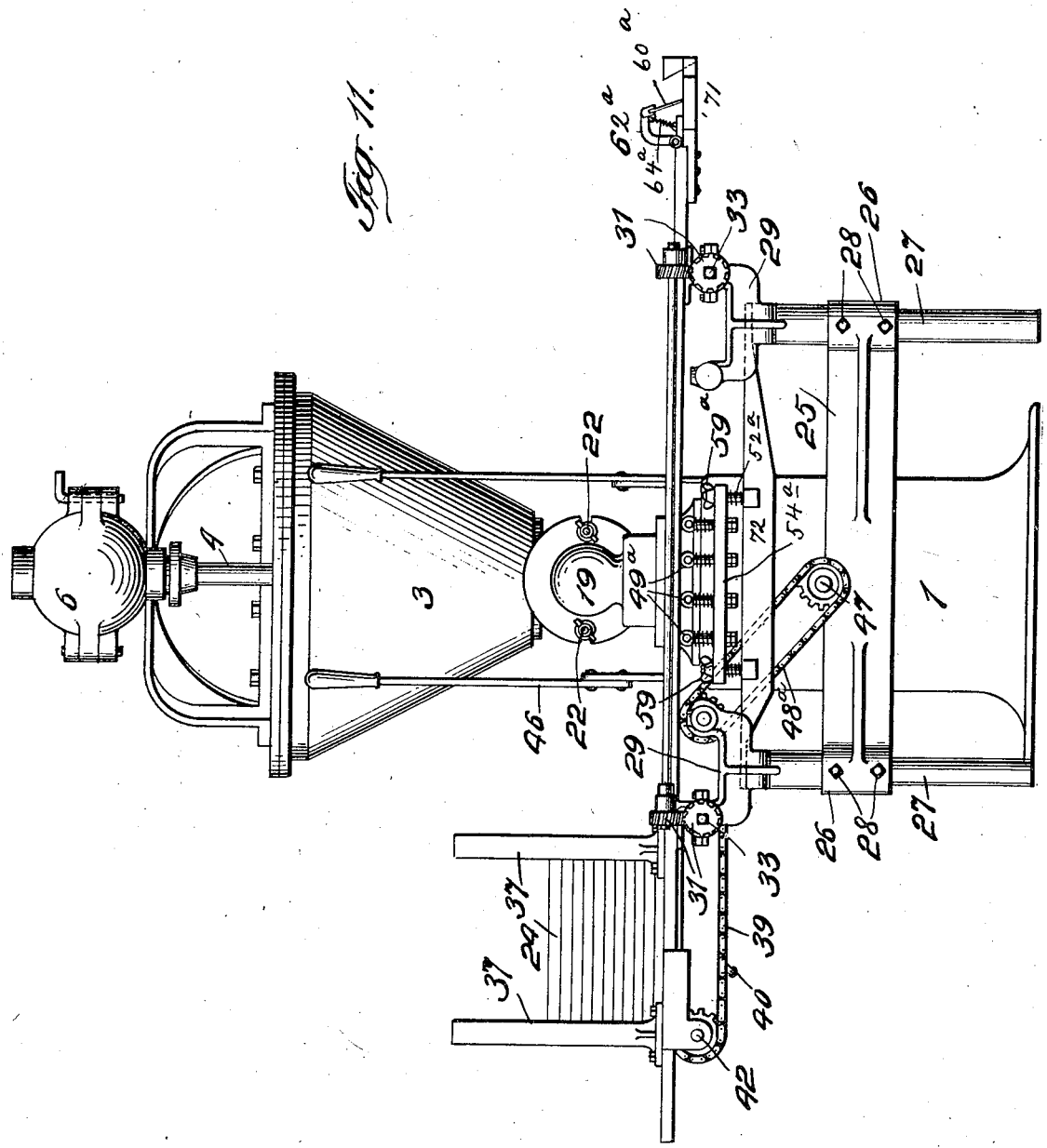

UNITED STATES PATENT OFFICE.

PAUL G. HOLLSTEIN, OF CARLSTADT, NEW JERSEY, ASSIGNOR TO J. M. LEHMANN COMPANY, OF NEW YORK, N. Y., A CORPORATION.

MACHINE FOR MOLDING CHOCOLATE PASTE.

1,196,865.  Specification of Letters Patent.  Patented Sept. 5, 1916.

Application filed February 1, 1916. Serial No. 75,484.

*To all whom it may concern:*

Be it known that I, PAUL G. HOLLSTEIN, a citizen of Germany, and a resident of Carlstadt, in the county of Bergen and State of New Jersey, have invented certain new and useful Improvements in Machines for Molding Chocolate Paste, of which the following is a specification.

This invention relates to a machine of novel construction for molding chocolate paste into casts of various configurations. The machine is so constituted, that the air is effectively expelled from the paste prior to its introduction into the molds, from the delivery nozzle. The molds are adapted to travel along a track located above the discharge end of an upturned nozzle so that the paste is run into the lower hollowed face of the mold. By this arrangement, a number of advantages are obtained, which are hereinafter more fully referred to. The machine while being thus adapted for charging the molds from below, may by a simple change in adjustment, also be made to charge the molds from above, so that in this way, chocolate paste of greater or less consistency may be worked.

In the accompanying drawings: Figure 1, is a front elevation of a chocolate paste molding machine embodying my invention showing the parts adjusted for delivering the paste upwardly against the bottom of the molds; Fig. 2, a vertical cross section on line 2—2 Fig. 1; Fig. 3, a longitudinal section of the mold carrying track on line 3—3 Fig. 4; Fig. 4, a plan of Fig. 3; Fig. 5, an enlarged cross section on line 5—5 Fig. 1; Fig. 6, a similar cross section on line 6—6 Fig. 1; Fig. 7, a detail cross section of one of the scrapers; Fig. 8, a plan of the scraper; Fig. 9, a section on line 9—9 Fig. 7, Fig. 10, a section on line 10—10 Fig. 2, and Fig. 11, a front elevation of the machine showing the parts adjusted for delivering the paste downwardly into the top of the molds.

Upon the frame 1 of the machine, is mounted, a hopper 2, adapted to receive the chocolate paste to be molded, the hopper being provided with a jacket 3, receiving a suitable heating medium. Axially through hopper 2, extends the shaft 4 of a stirring blade 5, which is mounted in upper bearing 6 of frame 1. Shaft 4, is rotated from the power shaft 7, carrying loose and fast pulleys 8, and intergeared by wheels 9 with the shaft 10, of a conveyer screw hereinafter described. Shaft 10 is by sprocket wheel 11, chain 12, sprocket wheel 13, shaft 14, and bevel wheels 15, intergeared with shaft 4 of stirrer 5, so that the latter is rotated within hopper 2, as will be readily understood. A belt shifter 16 of conventional construction, serves to stop or start the machine in well known manner. Hopper 2 opens into a horizontally disposed tubular casing 17 through which extends axially, the shaft 10 of a screw conveyer 18, by means of which the paste delivered from the hopper is forced along the casing. The latter at its delivery end, communicates with a nozzle 19 which is provided with a contracted neck 20, by means of which a pressure is exerted upon the advancing paste prior to its discharge from the nozzle. This pressure serves to expel any air from the paste, said air being forced backward through a number of openings 21 formed in the convolutes of conveyer 18. Nozzle 19 is removably attached to casing 17 by means of bolts 22 and winged nuts 23, and may thus be set to point either upward or downward, the former position being illustrated in Fig. 2.

When pointing upward, the nozzle is adapted to deliver the paste, against the lower hollowed faces of a series of molds or matrices 24, which travel in a continuous procession over the nozzle, while when the nozzle points downward, the paste is delivered to the upper hollowed faces of such molds, the former adjustment being adapted for molding thick paste, while the latter adjustment is adapted for molding comparatively liquid paste.

The construction of the mold guiding, and conveying means, is as follows: Frame 1, is furnished with a pair of arms 25 provided with tubular eyes 26, that receive a pair of posts 27, which are vertically adjustable within the eyes by means of clamp screws 28. Upon each post is fast, a U-shaped cross head 29 in which is journaled, a screw 30 having right and left threads. The two screws 30 are operatively connected to each other by means of spiral gear wheels 31 and a shaft 32 so that if either one screw is turned by means of its squared head 33, a corresponding movement will be imparted to the other screw. The right and left threads of screws 30 are engaged by the threaded hubs 34 of rests 35, upon which a pair of rails 36 are supported. These rails constitute the track of molds 24, and may, by the means described, be moved toward or away from each other, so as to change the gage of the track, and thus adapt the machine for molds of different lengths. The correlation of the parts is such, that the center of nozzle 19 coincides substantially with the center of the track, so that the paste is evenly distributed over the entire lower surface of the molds.

At their receiving ends, rails 36, carry a magazine within which the empty molds are stacked, said magazine comprising a number of uprights 37, having ribs 38 which stop short such a distance from the rails, that while confining all of the upper molds, they will be cleared by the lowermost mold, which rests on rails 36. Below magazine 37, there extend between rails 36, the upper runs of a pair of parallel conveyer chains 39 having a plurality of toes 40 that are adapted to grasp the lowermost mold and carry it a distance along the track, the subsequent movement of such mold being effected by the rear string of molds that push against the foremost mold as will be readily understood. Conveyer chains 39, engage sprocket wheels 41 mounted on transverse shafts 42, one of which is driven from shaft 7 in the following manner: Shaft 7, is by chain drive 43 connected to a stub shaft 44 which by clutch 45 (operated by lever 46), is coupled to a counter shaft 47 which is again by chain drive 48 connected to the aforesaid shaft 42.

As the molds pass along the track, they are engaged by a series of pressure rolls 49 extending across the latter. These rolls turn on shafts 50 into the enlarged ends 51 of which are tapped, bolts 52 encompassed by springs 53 and passing loosely through a pair of bars 54. These bars are arranged in parallelism to rails 36 and are adjustably secured to cross heads 29, by bolts 55, lugs 56 (that rest on rails 36) and bolts 57 that pass loosely through bars 54, and are encompassed by springs 58. By turning winged nuts 59 engaging bolts 57, the elevation of bars 54 and consequently the elevation of pressure rolls 49 relatively to the track may be adjusted, so that in this way, the spring pressure of the molds against nozzle 19 may be correspondingly varied.

As the molds pass over the nozzle, they will become charged with the chocolate paste which will adhere thereto owing to the consistency of the mixture. This paste will, with the adjustment shown in Fig. 1, be forcibly projected against the lower faces of the molds and completely fill the same. The pressure of the paste against the molds would have a tendency to raise the same off the track, which tendency is checked by the rolls 49, that hold the same yieldingly upon the track. As the molds are not always quite true, owing to protracted use, or are somewhat unequal in height, the spring pressure of the rolls, compensates for any such irregularities, and prevents binding during the travel of the molds along the track. During the latter part of their movement, the molds will pass over a pair of knives or scrapers 60, that extend in an oblique direction across the underside of the track, and serve to scrape any surplus paste from the face of the mold. This paste on being so removed, falls by gravity directly into a lower pan or receiver 61, any mechanism for carrying the scrapings from the molds to said receiver being entirely obviated with the overhead feed of the molds described. This feature is an important element of my construction as it not only simplifies manipulation, but insures cleanliness, and materially reduces waste.

Knives 60 are mounted in slotted elbowed holders 62 that are pivoted to rails 36 at 63, and are influenced by springs 64, that tend to draw the knives against the molds, so that in this way, the desired scraping action by the knives is insured.

Means are provided at the delivery end of rails 36, for reversing the molds, and thus righting the same, prior to their discharge from the machine. These means are as follows: Near their ends, rails 36 are connected by a cross piece 65 and at a distance beyond said cross piece, by bolts 66ᵃ with curved extensions 66, furnished with correspondingly curved flanges 67, upon which the mold is pushed, said flanges 67 clearing the track rails 36 at their inner ends. From cross piece 65, depend a pair of inclined hook shaped rests 68, arranged between a pair of cheeks 69 depending from rails 36 and having flanges 70 paralleling the rests. After the mold has been pushed upon extensions 66, it will by dropping upon flanges 67, become clear of the feeding influence of the next mold and thus its forward movement will cease. The mold will thus be free to glide backward along inclined flanges 67, and be projected over the lower edges thereof. During this return movement, the mold will gradually assume a more or less upright position until its lower edge strikes the inclined rests 68, 70 by means of which the complete reversal or righting of the mold is effected prior to its delivery from the machine for further treatment.

As has been stated, the machine may be used either to charge the molds from below or from above, the position of the parts for the former operation being illustrated in Fig. 1 of the drawing. If it is desired to charge the molds from above, Fig. 11, nozzle 19 is reversed, to discharge downwardly, posts 27 are lowered in eyes 26 to carry the track 36 below the mouth of the nozzle, and the chain drive 48, is replaced by a shorter chain drive 48ª. The curved rail extensions 66 are unbolted, the cross piece 65 together with rests 68 is removed and the cheeks 69, are detached from rails 36, so that the entire reversing mechanism is done away with. This mechanism is replaced by an attachment comprising an extension 71 which is bolted to the rails 36, and carries a pivoted arm 62ª provided with a scraper 60ª and influenced by a spring 64ª. The arm 62 with scraper 60 is removed, as are also the rails 54 with pressure rolls 49. The latter are replaced by similar spring pressed rolls 49ª mounted on a rail 54ª which is mounted by spring influenced bolts 52ª having nuts 59ª upon a cross piece 72, placed on cross heads 29. Rolls 49ª are located below nozzle 19 and serve to yieldingly support the molds as the latter are charged from the nozzle, the tread of the rails being here removed for the accommodation of the nozzle, when the latter points upwardly (Fig. 3). Owing to this yielding support, the molds will become truly charged even when somewhat unequal in height.

I claim:

1. A machine for molding chocolate paste comprising a track, means for feeding a reversed mold along the track, an upwardly directed nozzle facing the lower side of the mold, a pair of members extending along the track, means for adjusting the elevation of said members above the track, and a plurality of pressure rolls journaled in said members and extending across the track, said rolls being adapted to engage the upper side of the mold.

2. A machine for molding chocolate paste comprising a track, means for feeding a reversed mold along the track, an upwardly directed nozzle facing the lower side of the mold, a pair of bars arranged in parallelism with the track, means for adjusting the elevation of the bars above the track, spring-influenced bolts passing loosely through the bars, shafts carried by the bolts, and pressure rolls rotatable on the shafts and extending across the track, said rolls being adapted to engage the upper side of said mold.

3. A machine for molding chocolate paste, comprising a pair of track rails, a pair of curved rails extending upwardly beyond said track rails, said curved rails being provided with flanges that clear the track rails at their inner ends, a series of hook-shaped rests arranged below the ends of the track rails, a nozzle, a mold, and means for feeding said mold along the track rails and upon the curved rails.

PAUL G. HOLLSTEIN.